United States Patent [19]

Piramoon

[11] Patent Number: 5,057,071
[45] Date of Patent: Oct. 15, 1991

[54] HYBRID CENTRIFUGE ROTOR
[75] Inventor: Alireza Piramoon, Santa Clara, Calif.
[73] Assignee: Beckman Instruments, Inc., Fullerton, Calif.
[21] Appl. No.: 396,777
[22] Filed: Aug. 21, 1989

Related U.S. Application Data

[63] Continuation of Ser. No. 849,912, Apr. 9, 1986, abandoned.
[51] Int. Cl.$^5$ .......................... B04B 5/02; B04B 7/08; B23P 11/02
[52] U.S. Cl. ........................................ 494/16; 29/447; 494/81
[58] Field of Search ...................... 494/16, 17, 20, 24, 494/81; 156/173, 175, 180, 330; 29/447

[56] References Cited

U.S. PATENT DOCUMENTS

| | | | |
|---|---|---|---|
| 3,248,046 | 4/1966 | Feltman, Jr. et al. | 494/16 |
| 3,797,737 | 3/1974 | Kadotani et al. | |
| 3,844,730 | 10/1974 | Laussermair | 494/81 |
| 3,913,828 | 10/1975 | Roy | 494/81 |
| 3,993,243 | 11/1976 | Dietzel et al. | 494/81 |
| 4,093,118 | 6/1978 | Sinn et al. | 494/81 |
| 4,102,490 | 7/1978 | Chulay | 494/16 X |
| 4,160,521 | 7/1979 | Lindgren | 494/81 |
| 4,170,814 | 10/1979 | Baram | 29/452 |
| 4,468,269 | 8/1984 | Carey | 156/175 |

FOREIGN PATENT DOCUMENTS

| | | | |
|---|---|---|---|
| 1050911 | 1/1954 | France | 494/81 |
| 2107539 | 5/1972 | France | |
| 2504410 | 10/1982 | France | |
| 2098515 | 11/1982 | United Kingdom | |

Primary Examiner—Harvey C. Hornsby
Assistant Examiner—Scott J. Haugland
Attorney, Agent, or Firm—William H. May; P. R. Harder; Wen Liu

[57] ABSTRACT

A hybrid centrifuge rotor having a rotor core surrounded by a prestressed anisotropic reinforcement ring is disclosed. The rotor core may be made from aluminum and an anisotropic reinforcement ring may be a cylindrical filament wound ring, made from graphite fiber and epoxy resin. The rotor core is manufactured to have a nominally greater diameter than the inner diameter of the reinforcement ring. This rotor core, during the manufacturing process, is subjected to a cryogenic environment where the diameter is shrunk down so that the rotor body may fit and telescope within the reinforcement ring. The rotor body core and reinforcement ring assembly, upon attainment of ambient temperatures, have an interface fit wherein substantial outward force from the rotor body core prestresses the reinforcement ring so that a light weight and strong centrifuge rotor is disclosed.

9 Claims, 2 Drawing Sheets

HYBRID CENTRIFUGE ROTOR

This is a continuation of application Ser. No. 06/849,912, filed Apr. 9, 1986, abandoned.

FIELD OF THE INVENTION

This invention relates to ultracentrifuge rotors, for use in ultra high speed centrifuges, and in particular to a hybrid material rotor, having a central core of one material surrounded by a ring of another material.

BACKGROUND OF THE INVENTION

Ultracentrifuge rotors encounter extreme stress as increasingly higher speeds are necessary for the application of such rotors for new and increasingly complicated scientific experimentation. High capacity and speed rotors are generally larger fixed angle and vertical tube rotors having high kinetic energies. High stresses are created in these high speed, high energy rotors, which makes material selection the primary design criteria. For this reason, titanium is the isotropic material most often chosen for high speed, large volume rotor design.

Conventional high kinetic energy rotors, capable of high speed operation, are typically manufactured of titanium, an isotropic material with a density of approximately 0.16 lb/in$^3$. Titanium is a stiff metal which is difficult to machine, due to its density, and very expensive. Additionally, since increasing speeds require increasing strength, the kinetic energy that a titanium rotor would endure will increase proportional to its density and the square of rotational speed that the rotor is driven; the strength of metal material cannot be significantly improved by increasing the rotor size, diameter, or thickness.

Heretofore, centrifuge rotors have been made, for low speed application, from laminated fiber resin material shells as a means of reliance upon other than an all-metal design. U.S. Pat. No. 3,993,243 to Dietzel is an example of a centrifuge drum shell made from a laminated material of fibers and resins, having a metal bottom and top forming circular metal plates. The metal plates have flanges that secure the plates to the centrifuge drum shell by means of fastening screws. The drum shell is cross-sectionally configured in numerous layers (See FIG. 2 of the '243 patent) including axially extending wires 114 and the use of a wide mesh backing strainer 16. This design, which includes fasteners, is suitable for lower speed applications, but would not sustain the stress induced by ultra high speeds.

Likewise, layered material rotors made from steel covered resin plastic materials are taught by U.S. Pat. No. 3,997,106 to Baram. Alternate embodiments in FIGS. 3 and 4 of the '106 patent teach the use of piano wire 24 to surround a perforated steel belt covering an inner body made from molded plastic resin material. This design may be useful in centrifuge rotors used by low speed liquid separators, but would not withstand the stress of high drive speeds.

U.S. Pat. No. 4,160,521 to Lindgren teaches the manufacture of a fibre-reinforced rotor for use in centrifugal separators, impellers, generators, and flywheels. The rotor body shell is composed of an outer layer made from a fiber wound filament which is wound about an intermediate sleeve made of a plastic resin or aluminum. The outer layer forms a fiber-laminate sleeve member which prestresses the internal intermediate sleeve. The outer layer is affixed to the inner intermediate sleeve by a pressing-on wind of the outer layer to the inner sleeve. This pressing-on wind prestresses the inner sleeve which decreases the diameter of the inner sleeve slightly. As a result of mechanically prestressing the inner sleeve, the '521 patent teaches that a reinforced rotor can operate at speeds where a metal inner sleeve only rotor would deform or break before reaching higher speeds. In discussion of prior art, the '521 patent makes note of a temperature "shrinkage fit" wherein an internal metallic member is kept at a low temperature while an external fiber laminate sleeve is applied to the metal member (col. 1, lins 34–51). The '521 patent asserts that only a limited temperature reduction is obtainable, and that high surface pressure between the fiber reinforced sleeve and the metal member cannot be achieved when the inner member returns to room temperature. The '521 patent teaches against temperature "shrinkage fit" designs. This patent fails to recognize the possibility of significant shrinkage using very cold temperatures.

Thus, the U.S. Pat. No. 4,160,521 patent teaches away from "shrinkage fit" between differing material layers of a rotor body, and towards the concept of prestressing a composite sleeve over an inner body, since the '521 patent does not believe that shrinkage fit will be achievable.

U.S. Pat. No. 4,468,269 to Carey (assigned to the common assignee of this application) and U.S. Pat. No. 3,913,828 to Roy both disclose an ultracentrifuge rotor design comprising a plurality of "nested" rings of filament wound layers surrounding the cylindrical wall of a metal body rotor. The rings are "nested" together by a thin coat of epoxy between each ring. The rings are manufactured by winding on mandrels having different diameters, the diameters being chosen so that each ring section will be manufactured within a uniform range of ten to fifteen layers of filament thick. By fabricating the rings in thin sections and then nesting the rings together, it is possible to achieve a rotor structure where the filament density of the outside diameter of the ring is as high as the inside diameter of the ring. The nested telescoped polymer rings are epoxied to a coating wall 13 (FIG. 1 of the '269 patent) and pressed onto the wall 13 using small axial loading pressures. The final structure is temperature cured. The structure relies upon temperature cured epoxy layers to reinforce the central wall 13 structure, the wall selected from titanium, aluminum or heat treated steel.

None of the conventional hybrid rotor designs are directed to a single shell, simplified reinforcement structure.

The prior art did not address a fundamental problem, which was that both static and dynamic loads must be analyzed and considered when one wishes to design a multi-material rotor for ultracentrifuge application.

The Lindgren '521 patent and the Carey '269 patent address the static load inquiry, but not the dynamic loading results of their respective designs. Static loading is the stress between the core body and outer material ring when the rotor is at rest. These static loads are important to hold together any hybrid rotor assembly at rest; but, when rotation of the rotor occurs, a tangential outward stress arises. The core bodies of the '521 and '269 patent designs expand at a slower rate than the outer ring, so that the outer ring may not remain stress loaded on the core body during dynamic rotor operation. Because the core body expands at a slower rate than the outer ring during conditions of dynamic loading, the ring may slip away from the core body and no longer maintain a pre-stressed load on the body.

Heretofore, aluminum and titanium have been the materials selected to comprise an isotropic material rotor. Aluminum alone may be used for high speed applications only where the stresses created by a rotor filled with fluid specimen are considerably less than the stress failure point of the aluminum body. Where high capacity rotors require greater speeds, the rotors, heretofore, have been designed using titanium, a dense material capable of withstanding higher stresses and capacities of sample fluid than a comparable size high capacity aluminum rotor. Heretofore, only titanium has been able to withstand the dynamic stresses of high speed, high capacity centrifugation. Any lower density design, such as an aluminum and composite material ring design, must be able to withstand the same dynamic loads that the titanium rotor encounters.

What is needed is a hybrid rotor design which takes into account the need for addressing both the static and dynamic load characteristics of such a multi-material design. While an outer fiber-reinforced shell, like the Lindgren '521 patent, pre-stresses the core during static conditions, this inward stress causes undue and unwanted non-uniform stress to arise within the core body during rotational conditions of dynamic load.

What is needed is a simplified reinforced rotor which eliminates the need for titanium at ultra high speeds, substituting a lighter and more machinable metal as the core of a reinforced rotor.

SUMMARY OF THE INVENTION

A hybrid centrifuge rotor body is disclosed which is made from two primary portions, a rotor core body and a reinforcement ring. The rotor core body is an isotropic material such as aluminum metal. The reinforcement ring which surrounds the rotor core body is made from an anisotropic material such as a graphite fiber and an epoxy resin filament wound material. (As used in this application, the term "anisotropic" shall mean a material having properties, such as bulk modulus, strength, and stiffness, oriented in a particular direction.) The resin in the reinforcement ring may have thermoplastic or thermoset properties. The fiber of the filament-wound ring may be a material such as glass or the organic resin fibrous material Kevlar®, made by Du Pont, which are both useful substitutes for graphite.

The isotropic core body of the hybrid centrifuge rotor prestresses the filament-wound anisotropic reinforcement ring. The core body is designed to originally be nominally of greater diameter than the reinforcement ring. The core body is then uniformly temperature shrunk in a cryogenic environment and fit for positioning within the inner diameter of the reinforcement ring upon final assembly of the rotor, telescoped within the reinforcement ring, so that the core body pre-stresses the reinforcement ring. The core body pre-stresses the ring as the body returns to ambient temperatures after removal from the cryogenic environment. The pre-stressing arises as the core body attempts to restore its original dimensions. The cryogenic environment may be achieved by bathing the isotropic core body in a liquid nitrogen bath. The core body may be uniformly shrunk to a maximum degree calculated according to the equation "$\delta = \alpha L \Delta T$, where $\delta$ is the shrinkage; $\alpha$ is the coefficient of thermal expansion; L is the diameter of the metal core body; and, $\Delta T$ is the temperature difference between the ambient room temperature and the cryogenic environment. The core body is then bathed in a cryogenic environment for an optimum time period to achieve a shrinkage of the core body within the computed range defined by the above equation. The core body then re-expands at ambient temperature after being positioned and telescoped within the reinforcement ring at a uniform rate.

The anisotropic reinforcement ring which surrounds the core body may be filament wound in a conventional circumferential manner where the orientation of the fiber wind is zero degrees from a horizontal plane parallel to the base of the rotor core body. In an alternative embodiment, the filament-wound ring may be wound in a criss-cross fashion at an orientation angle other than the horizontal plane, in order to further enhance and strengthen the reinforcement ring.

A method of manufacturing a hybrid centrifuge rotor is also disclosed which includes the steps of placing the isotropic metal material rotor core body into a cryogenic environment, such as liquid nitrogen, which uniformly shrinks the size of the core body; fitting an anisotropic material reinforcement ring around the shrunken core body such that the rotor core body is surrounded by and telescopes into the reinforcement ring; allowing the rotor core, assembled into the reinforcement ring, to return to ambient temperatures, causing the core to restore its original size and interference fit against the ring. As a part of the method of manufacture, the size of uniform shrinkage of the core body may be determined by the formula heretofore referred to for uniformly shrinking a body in a cryogenic environment. The ring preferably is placed around the cryogenically treated core body, but it may alternatively have the core body positioned within the ring's diameter.

By pre-stressing the reinforcement ring, due to the interference fit of the core body and ring, a strong static load is achieved. The outward expanding core body pre-stresses the reinforcement ring by achieving a high static load of the core body against the ring. During rotation and conditions of dynamic loading, the high modulus present in the reinforcement ring tend to contain the core body as centrifugal forces tend to build within the core body. In this manner, a hybrid rotor design is achieved which compensates for both static and dynamic loading.

DETAILED DESCRIPTION OF THE PREFERRED EMBODIMENT

Figure 1:
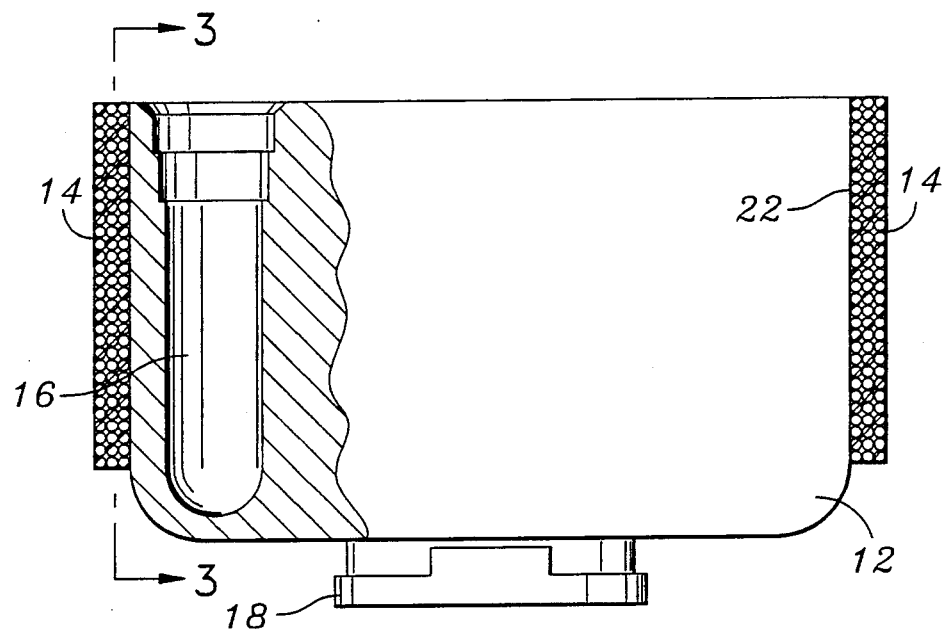
FIG. 1 is an elevational cross-sectional view of a hybrid centrifuge rotor of this invention taken along the diameter of a vertical tube rotor body manufactured according to this invention.

The hybrid rotor of this invention comprises two major components, namely, an isotropic rotor core and an anisotropic reinforcement ring. With reference to FIG. 1, a cross-sectional view of the preferred embodiment of a hybrid centrifuge rotor is shown generally. The isotropic rotor core 12 is preferably made from aluminum, which has a density of approximately 0.11 lb/in$^3$. This metal rotor core body 12 has a density substantially less than the conventional isotropic unibody rotor made from titanium, which has a density of 0.16 lb/in$^3$.

Circumferentially surrounding the rotor core body is an anisotropic reinforcement ring 14. The reinforced ring 14 is a cylindrical graphite fiber and epoxy resin filament-wound ring. The density of the composite material filament-wound reinforcement ring 14 is approximately 0.06 lb/in$^3$. Thus, for a vertical tube rotor as shown in FIG. 1, the density of the entire rotor assembly of the preferred embodiment is substantially lower than a conventional titanium rotor. The cutaway view of the hybrid rotor of FIG. 1 shows a vertical test tube cavity 16 formed within the rotor core body 12. FIG. 1 shows the hybrid rotor assembly having a drive shaft hole 18 for receiving the drive shaft (not shown).

The design of a large capacity centrifuge rotor body which may be driven at high speeds must meet various criteria. Among these criteria is a consideration of the density or weight of the rotor. The lower the density, the lower the kinetic energy that will be generated at a given rated speed in the event of a mishap. A lighter weight rotor, such as disclosed in this application, will require substantially less acceleration and deceleration time, and the choice of aluminum as a core body represents a substantial reduction in manufacturing cost over the conventional titanium rotor. Heretofore, even with the disadvantages of cost and a difficulty of machining, titanium was chosen as the conventional design for a high density, high energy centrifuge rotor because only titanium could withstand very high speeds for large capacity applications that were desirable for the application and performance of various research biological separations of organic materials. Although a titanium rotor offers strength, its higher density generates higher kinetic energy as the rotor speed increases, which requires a corresponding increase in the strength and weight of the centrifuge barrier ring needed to contain this higher energy rotor in the event of a rotor failure. The hybrid rotor disclosed herein is of lighter weight and density than the conventional titanium centrifuge rotor, and thus a lower kinetic energy than a conventional titanium rotor requiring no change in centrifuge barrier ring design, yet capable of withstanding high speeds without undue stress to the hybrid rotor core body.

The hybrid rotor of this invention accomplishes the goal of providing a lower density centrifuge rotor assembly by the nature in which the rotor core body and reinforcement ring interface. Heretofore, conventional interface in prior multi-layer material centrifuge rotor body designs have relied on prestressing of the rotor body core. Heretofore, the outer ring was designed to prestress the rotor core body such that a strong interface would be accomplished. However, prestressing the rotor core body by pressure-fit methods in a conventional manner may lead to faults, cracks, and strains within the rotor core body 12 which, at the ultra high speeds attainable by a centrifuge motor drive, might lead to destruction of the rotor core body and a potential mishap.

The disclosure of this invention chooses to prestress the reinforcement ring. This is accomplished by an interference fit resulting in an interface outward stress in excess of 50,000 psi static loading between the reinforcement ring 14 and the rotor core body 12. (As used in this application, the term "interference fit" means that where two parts are mated to form an assembly, like the core body 12 and the ring 14, one of the parts (in this case the core body) is forced to occupy a space smaller than its normal size, so that internal stresses within that first part cause this first part to exert a uniform stress against the other second part which the first part abuts.) The rotor core body 12 is designed to initially have a diameter which is nominally larger than the inner diameter of the reinforcement ring 14. The rotor core body 12 is then placed into a cryogenic environment where it is uniformly temperature shrunk so that the diameter of the rotor core body 12 will be just under the inner diameter of the reinforcement ring 14, so that the reinforcement ring 14 surrounds the core body 12 and the rotor core body 12 is telescoped within the reinforcement ring 14. The rotor may, alternatively, be assembled by placing the core body 12 within the inner diameter of the reinforcement ring 14. The rotor core body 12, in the preferred embodiment, is placed in a liquid nitrogen bath at a temperature of $-290°$ F. for a period of 0.25 hours. By bathing the rotor core body 12 in a liquid nitrogen bath, uniformity of shrinkage is achieved. The maximum amount of shrinkage possible may be calculated according to the formula $\delta = \alpha \cdot L \Delta T$:
where, $\delta$ = shrinkage (measured in inches);

$\alpha$ = the coefficient of thermal expansion; (measured in inches per degree Fahrenheit);

L = the diameter of the metal core measured in inches; and, $\Delta T$ = the temperature difference between the temperature of the cryogenic environment liquid nitrogen bath (approximately $-290°$ F.) and an ambient temperature of approximately $+77°$ F.

In the preferred embodiment, $\Delta T$ would be approximately $-367°$ F. In this manner, $\delta$, shrinkage, would be measured in negative ($-$) inches.

After this maximum shrinkage is calculated, an experiment plot of shrinkage vs. time is undertaken to discover the optimum length of time that the core body 12 should be bathed in liquid nitrogen to achieve a desirable shrinkage within the calculated range.

After the rotor core body 12 is bathed in the liquid nitrogen cryogenic environment for an optimum period of time, the reinforcement ring may be assembled to surround the rotor core body. Along the interface 22 between the rotor core body 12 and the reinforcement ring 14 there is an interference fit. This interference fit between the rotor core and the reinforcement ring is accomplished by thermally shrink fitting the rotor core body 12 to a small enough diameter that the reinforcement ring 14 will surround the core body rather than mechanically forcing the rotor core body 12 to fit inside the reinforcement ring 14. The interference fit is achieved by taking advantage of the higher coefficient of thermal expansion of the metal core, when compared with the coefficient of thermal expansion of the reinforcement ring. Once the cryogenically treated core body is placed into a telescoped position within the ring, the ring is rapidly cooled, initially, by the core body due to the residual thermal effect which the extremely cold core body imparts on the ambient temperature ring 14; but, the ring expands slower than the core body due to its lower thermal coefficient of expansion. In other words, the cryogenic environment more rapidly shrinks the rotor core body 12 than any residual thermal affect the assembly procedure might have on the reinforcement ring. Thus, upon assembly, as the rotor core body 12 returns to ambient room temperature, it presses outward and prestresses the reinforcement ring 14, without undue stress on the rotor core body 12. This is so because the rotor core body 12 expands outward uniformly so any stress on the core body 12 is distributed throughout this body so that it will be less likely for cracks and faults to arise.

The reinforcement ring 14 is manufactured as a filament-wound composite of a graphite fiber and epoxy resin. In the preferred embodiment, the graphite fiber used to form the ring 14 is wound at a zero degree angle to the horizontal plane of the base of the rotor body 12. This form of construction induces hoop stress within the reinforcement ring which balances and opposes the outward stress of the rotor core body 12. The core body 12 and ring 14 are held tightly together due to their interface 22 by means of an interference fit. The reinforcement ring 14, due to its uniform windings, is an anisotropic material which orients stresses which may arise when the centrifuge assembly is rotating in a preferred direction, utilizing the unidirectional stresses which arise in the reinforcement ring 14 to hold the aluminum core body 12 together at speeds in excess of that which an aluminum body of unitary construction could possibly sustain. By having the reinforcement ring 14 be one continuous cylindrical filament-wound ring, the invention is able to take advantage of the relative difference between the coefficient of thermal expansion of the metal rotor core body 12 and the reinforcement ring 14, to reduce stresses arising in the rotor core. The reinforcement ring 14 acts to reinforce the strength of the rotor core body 12 without placing substantial additional stress on the rotor core body, since it is the core body which pushes outward against the inner diameter of the reinforcement ring 14 such that, along the interface 22 between the rotor core body 12 and the reinforcement ring 14, stress is displaced out to the reinforcement ring and away from the rotor core body.

Alternative materials may be used to construct the reinforcement ring 14. Instead of graphite, one may select a fiber for the filament-wound ring made from glass or the organic resin Kevlar ®, made by Du Pont. In place of the epoxy resin, one may use any conventionally acceptable thermoplastic or thermoset resin.

Figure 2:
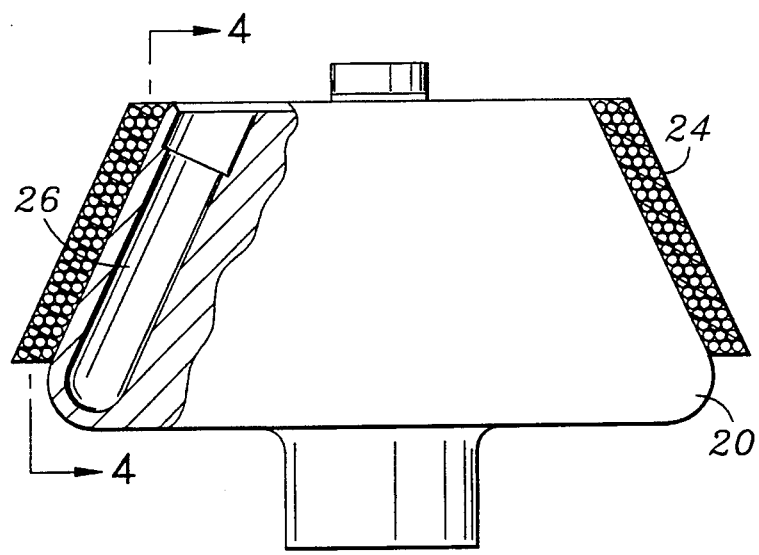
FIG. 2 is a cross-sectional elevational view of a fixed-angle rotor manufactured as a hybrid centrifuge rotor, taken along the diameter of said rotor.
Figure 3:
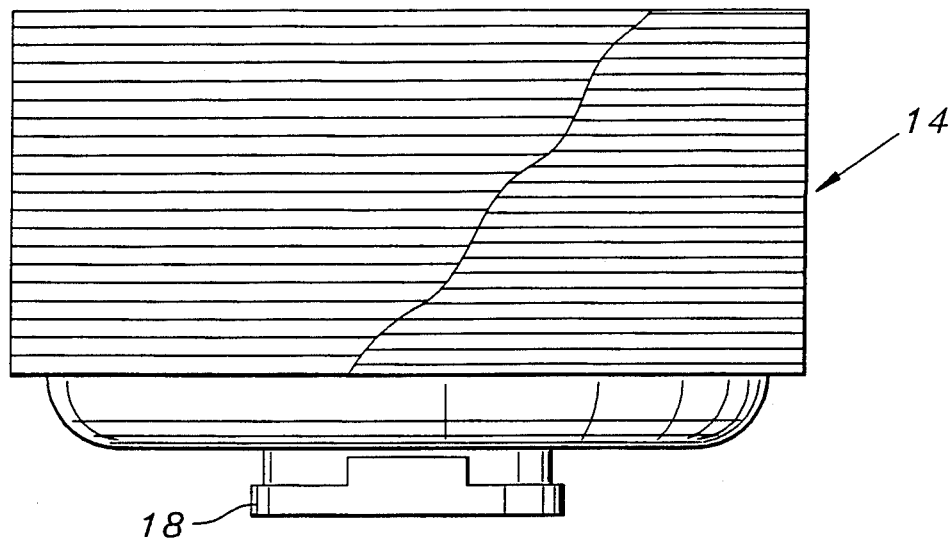
FIG. 3 is a sectional view of the reinforcement ring taken along line 3—3 in FIG. 1 showing the horizontal filament winding.
Figure 4:
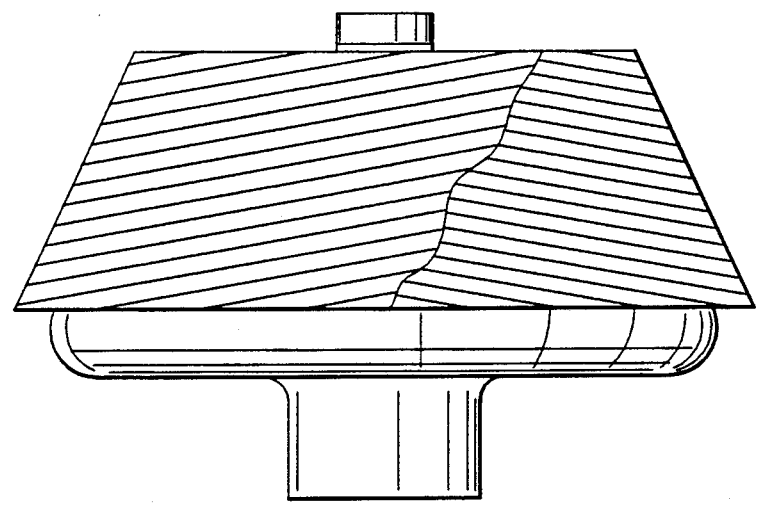
FIG. 4 is a sectional view of the reinforcement ring taken along line 4—4 in FIG. 2 showing the criss-cross filament winding.

FIG. 2 shows a fixed angle rotor that may be assembled as a hybrid centrifuge rotor according to the method of manufacture for assembling the vertical tube rotor of FIG. 1. The fixed angle rotor of FIG. 2 has a central tapered rotor core body 20 surrounded by a frustoconically shaped reinforcement ring 24. The frustoconical reinforcement ring 24 may be manufactured according to the criteria heretofore discussed for making the reinforcement ring 14. Such a fixed angle design, providing test tube inserts 26 within the rotor core body 20 is possible, because when the tapered rotor core body 20 is bathed in liquid nitrogen, its shrinkage along its diameter is linear along each of a plurality of horizontal planes; i.e., the relationship between diameter shrinkage and the coefficient of thermal expansion of the tapered rotor core body 20 is linear and uniform along any horizontal plane cutting through the rotor body 20. This might not be the case if a conventional pressure or mechanical fit were attempted to assembly tapered rotor core body 20 into the frustoconical reinforcement ring 24.

In manufacturing the assembled centrifuge rotor of a hybrid design, it is important to recognize that a distinctive feature of the design is the interference fit. An experimentally derived plot of time vs. amount of shrinkage in a cryogenic environment indicated empirically that 0.25 hours was the optimum time for the liquid nitrogen bath to surround the metal rotor core body 12 or 20. In the preferred embodiment, a bath duration beyond 0.25 hours produces no significant further shrinkage, as the metal core body 12 has reached equilibrium with the nitrogen bath beyond a 15 minute period; however, using the shrinkage equation and the empirically derived plot of shrinkage against time is useful in deriving the optimum cryogenic bathing conditions when the shrinkage criteria differs from the preferred embodiment. After removing the rotor body core 12 from the liquid nitrogen bath, three to four hours are required after the reinforcement ring 14 is placed around the rotor core body 12 for the full effect of the interference fit to take place. Upon reaching the ambient temperatures, the core body 12, in attempting to restore its original ambient diameter exerts in excess of 50,000 psi outward pressure against the interface 22 with the inner diameter of the reinforcement ring 14.

The interference fit, resulting in an outward directed uniform stress by the core body 12 against the reinforcement ring 14, accommodate the design criteria for static and dynamic loads. While a hybrid rotor, designed to have an isotropic core body surrounded by an anisotropic reinforcement ring, is of greater static load strength than an all-aluminum rotor, it is the interference fit which provides a design which is also of superior dynamic load characteristics. By having the core body pre-stressing the ring, rather than the conventional approach of having the outer ring stress the core body, a load characteristic may arise which is effective in handling dynamic tangential centrifugal forces which arise during ultracentrifugation. The hoop stress present in the reinforcement ring of this invention, which counteracts the outward static load of the rotor core, also may contain the dynamic tangential forces so that the ring remains affixed to the core body during rotation. The interference fit, by placing primary static and dynamic loads on the ring rather than the core, as well as less load on the rotor drive bearings, accounts for the ability for the hybrid rotor of this invention to sustain rotor speeds equivalent or in excess of the speeds achievable by conventional isotropic titanium rotors.

A fully assembled large capacity hybrid centrifuge rotor, manufactured in accordance with the teachings of this disclosure, will allow an aluminum core rotor to safely reach an upper limit equivalent to or exceeding a conventional titanium rotor as opposed to a conventional large capacity aluminum unibody construction rotor having a lower maximum speed. The hybrid design, by prestressing the reinforcement ring 14, allows the reinforcement ring 14 to remain secure against the surface of the rotor body core 12 as higher centrifugal speeds are attained by the hybrid body rotor. The reinforcement ring 14 acts to safely hold the rotor core body 12 in place at speeds above the conventional upper limit of an aluminum body rotor. Because the aluminum core body stresses are within design criteria, and since aluminum is easier to machine, a core body having more capacity for a vertical tube rotor, like FIG. 1, can be made. This capacity is greater than the conventional eight cavity titanium rotor.

While the invention has been described with respect to a preferred embodiment vertical tube rotor and an alternate embodiment fixed angle rotor constructed as shown in detail, it will be apparent to those skilled in the art that various modifications and improvements may be made without departing from the scope and spirit of the invention. Accordingly it will be understood that the invention is not limited by the specific illustrative embodiment but only by the scope of the appended claims.

I claim:

1. A hybrid centrifuge rotor for rotation about a spin axis, said rotor comprising:

a solid isotropic core symmetrical about said spin axis;

said solid isotropic core defining an exterior surface of revolution having a first radius with respect to said spin axis at a normal operating temperature;

a plurality of cylindrical sample receiving apertures defined symmetrically about said spin axis in said solid isotropic core, said cylindrical sample receiving apertures leaving a mass of said isotropic core extending across said isotropic core which withstands dynamic forces on said isotropic core;

a filament wound anisotropic reinforcement ring constructed of circumferentially wound fibers, said ring having an inside surface of revolution symmetrical about said spin axis;

said filaments having greater stiffness and stress resistance circumferentially of said ring than in other directions with respect to said ring to impart increased circumferential stiffness and stress resistance anisotropically relative to said other directions of stiffness and stress imposed on said ring;

said filament wound anisotropic reinforcement ring defining at normal operating temperature an inside surface of revolution having a radius less than the first radius of the exterior surface of revolution of said isotropic core at said normal operating temperature of said isotropic core;

said exterior surface of revolution of said isotropic core having a second radius just less than the radius of the inside surface of revolution of said filament wound anisotropic reinforcement ring when said isotropic core is cryogenically cooled;

said second radius of said exterior surface of revolution of said solid isotropic core and said inside surface of revolution of said filament wound anisotropic reinforcement ring chosen to permit insertion of said isotropic core into said filament wound anisotropic ring when said isotropic core is cryogenically cooled whereby said isotropic core when cryogenically cooled just fits within said filament wound anisotripic reinforcement ring; and said isotropic core being thermally expanded interiorly of said filament wound anisotropic reinforcement ring to impart hoop tension to said anisotropic reinforcement ring and radial compression to said isotropic core.

2. The centrifuge rotor of claim 1, wherein the rotor core body is a light-weight aluminum material.

3. The centrifuge rotor of claim 1, wherein the reinforcement ring is a cylindrical graphite fiber and epoxy resin filament-wound ring.

4. The centrifuge rotor of claim 3, wherein the resin has thermoset properties.

5. The centrifuge rotor of claim 3, wherein the fiber of the filament-wound ring is an organic resin material.

6. The hybrid rotor of claims 1, wherein said anisotropic reinforcement ring surrounding said core is filament wound circumferentially at an orientation angle from the horizontal plane of the rotor core equal to zero degrees.

7. The hybrid rotor of claim 1, wherein the filament is wound in a criss-cross fashion at an orientation angle from the horizontal plane other than zero degrees.

8. A method of manufacturing a hybrid centrifuge rotor comprising the steps of:

providing a solid isotropic core symmetrical about a spin axis;

defining on said solid isotropic core an exterior surface of revolution having a first radius with respect to said spin axis at a normal operating temperature;

defining a plurality of cylindrical sample receiving apertures symmetrically about said spin axis in said solid isotropic core, said cylindrical sample receiving apertures leaving a mass of said isotropic core extending across said isotropic core which withstands dynamic forces on said isotropic core;

providing a filament wound anisotropic reinforcement ring constructed of circumferentially wound fibers, said ring having an inside surface of revolution symmetrical about said spin axis, said filaments having greater stiffness and stress resistance circumferentially of said ring than in other directions with respect to said ring to impart increased circumferential stiffness and stress resistance anisotropically relative to said other directions of stiffness and stress imposed on said ring;

defining on said filament wound anisotropic reinforcement ring an inside surface of revolution having a radius at said normal operating temperature less than the first radius of the exterior surface of revolution of said isotropic core at said normal operating temperature of said isotropic core;

forming said core so that said exterior surface of revolution of said isotropic core has a second radius just less than the radius of the inside surface of revolution of said filament wound anisotropic reinforcement ring when said isotropic core is cryogenically cooled;

and said second radius of said exterior surface of revolution of said solid isotropic core and said inside surface of revolution of said filament wound anisotropic reinforcement ring is chosen to permit insertion of said isotropic core into said filament wound anisotropic ring when said isotropic core is cryogenically cooled;

cryogenically cooling said isotropic core to just fit it within said filament wound anisotropic reinforcement ring; and thermally expanding said isotropic core interiorly of said filament wound anisotropic reinforcement ring to impart hoop tension to said anisotropic reinforcement ring and radial compression to said isotropic core.

9. A method as in claim 8 wherein the isotropic core is cryogenically cooled to at least approximately 290° F. below zero.

* * * * *